United States Patent
Gonnsen et al.

(10) Patent No.: US 8,910,907 B2
(45) Date of Patent: Dec. 16, 2014

(54) VARIABLE SEAT SEPARATION ADJUSTMENT IN AN AIRPLANE

(75) Inventors: Johannes Gonnsen, Hamburg (DE); Jens Gaertner, Hamburg (DE)

(73) Assignee: Airbus Operations GmbH (DE)

( * ) Notice: Subject to any disclaimer, the term of this patent is extended or adjusted under 35 U.S.C. 154(b) by 1015 days.

(21) Appl. No.: 12/865,246

(22) PCT Filed: Jan. 15, 2009

(86) PCT No.: PCT/EP2009/050404
§ 371 (c)(1),
(2), (4) Date: Sep. 13, 2010

(87) PCT Pub. No.: WO2009/095306
PCT Pub. Date: Aug. 6, 2009

(65) Prior Publication Data
US 2011/0017869 A1  Jan. 27, 2011

Related U.S. Application Data

(60) Provisional application No. 61/063,048, filed on Jan. 31, 2008.

(30) Foreign Application Priority Data

Jan. 31, 2008  (DE) .......................... 10 2008 006 947

(51) Int. Cl.
*B64D 13/00* (2006.01)
*B64D 11/00* (2006.01)
*B64D 11/06* (2006.01)

(52) U.S. Cl.
CPC ........ *B64D 11/00* (2013.01); *B64D 2011/0617* (2013.01); *B64D 11/06* (2013.01)
USPC ...................................................... 244/118.6

(58) Field of Classification Search
USPC ............ 244/118.5, 118.6, 122 R; 297/217.3, 297/248, 216.16, 232, 257
See application file for complete search history.

(56) References Cited

U.S. PATENT DOCUMENTS

| | | | | |
|---|---|---|---|---|
| 4,936,527 | A * | 6/1990 | Gorges | 244/118.6 |
| 7,137,594 | B2 * | 11/2006 | Mitchell et al. | 244/118.6 |
| 7,232,094 | B2 * | 6/2007 | Bishop et al. | 244/118.6 |
| 7,448,575 | B2 * | 11/2008 | Cheung et al. | 244/118.6 |
| 2005/0061914 | A1 | 3/2005 | Bishop et al. | |
| 2007/0284923 | A1 | 12/2007 | Thoreux et al. | |

FOREIGN PATENT DOCUMENTS

| | | |
|---|---|---|
| DE | 10211437 A1 | 10/2003 |
| EP | 0215495 A2 | 3/1987 |
| EP | 1849647 A2 | 10/2007 |
| JP | 2279433 A | 11/1990 |
| WO | 03074357 A1 | 9/2003 |

* cited by examiner

*Primary Examiner* — Valentina Xavier
(74) *Attorney, Agent, or Firm* — Lerner, David, Littenberg, Krumholz & Mentlik, LLP

(57) ABSTRACT

According to an exemplary embodiment of the invention, a system for simultaneous longitudinal shifting of several selected seats or seat rows in an aircraft is stated, in which system a drive device for shifting the seats is provided, wherein shifting the seats takes place according to a change in seat configuration planning.

10 Claims, 10 Drawing Sheets

# VARIABLE SEAT SEPARATION ADJUSTMENT IN AN AIRPLANE

CROSS-REFERENCE TO RELATED APPLICATIONS

This application is a national phase entry under 35 U.S.C. §371 of International Application No. PCT/EP2009/050404, filed Jan. 15, 2009, published in German, which claims the benefit of the filing date of U.S. Provisional Patent Application No. 61/063,048 filed on 31 Jan. 2008 and of German Patent Application No. 10 2008 006 947.7 filed on 31 Jan. 2008, the disclosures of which applications are hereby incorporated herein by reference.

FIELD OF THE INVENTION

The invention relates to the seat configuration in aircraft. In particular, the invention relates to a system for simultaneous longitudinal shifting of several selected seats or seat rows in an aircraft, to a seat arrangement in an aircraft, to the use of such a system in an aircraft, to an aircraft, and to a method for shifting seats or seat rows in an aircraft.

TECHNICAL BACKGROUND

An aircraft has a particular seat configuration or seat layout that is to be considered as being fixed and that is divided into 1, 2 or 3 classes.

Any reconfiguration involves rearranging this layout, for example in order to have more seats of a particular class available or in order to create more useable cabin space. The classes can differ from each other by various types of seats, or merely by their seat pitch.

If a flight is only partly booked it is still not possible to offer passengers greater comfort in the form of more space. Nor is it possible to implement short-term adaptation to the percentage distribution of the classes depending on passenger numbers. Likewise, at present it is not possible to implement a short-term adaptation to greater seating comfort in line with passenger's readiness to pay more.

SUMMARY OF THE INVENTION

It is an object of the invention to provide improved adaptable seat configuration in an aircraft.

Stated are a system for simultaneous longitudinal shifting of several selected seats or seat rows in an aircraft, a seat arrangement, the use, an aircraft, and a method according to the characteristics of the independent claims. Further embodiments of the invention are stated in the subordinate claims.

The described exemplary embodiments equally relate to the system, the seat arrangement, the use, the aircraft and the method.

According to an exemplary embodiment of the invention, a system for the longitudinal shifting of several selected seats or seat rows in an aircraft is stated, which system comprises a drive device for shifting the seats, wherein the system is designed for simultaneous shifting of the seats according to a change in seat configuration planning.

In other words, for example, changes in the seat configuration planning can be carried out from outside the aircraft. These changes are, for example, entered or initiated by a passenger via the booking process. This seat configuration planning is then communicated to the system so that the seats can be shifted correspondingly, for example fully automatically or completely manually. The system thus supports fast simultaneous shifting of the seats, if need be with a different seat pitch relative to other seats, depending on requirements. With this system it is thus possible to at the same time individually increase or decrease the seat pitch of the individual seats or seat rows.

Depending on the application, configuration and positioning of the individual seats or seat rows takes place fully automatically (in other words with corresponding electrical drives and electronic control and regulating devices) or, for example, purely mechanically with the simplest of means. Furthermore, mixtures of these two embodiments can be provided. For example, the configuration (in other words the planning as to the locations of the individual seats or seat rows) can be carried out electronically, wherein shifting of the seats or seat rows then takes place mechanically, in a manually-driven manner. Likewise, configuration can take place manually, for example in that a control chain is correspondingly "coded" (in other words set to the seat pitch to be achieved). Sliding of the seats then again takes place electrically, in other words automatically.

According to a further exemplary embodiment of the invention, the system is designed as a mechanically coupled system. For example, all the seats or seat rows in question are mechanically coupled to the drive device, which thereafter shifts all the seats simultaneously.

According to a further exemplary embodiment of the invention, the system for shifting the seats or the seat rows is implemented by applying traction to the individual seats or seat rows. The drive device is a transport device, for example a transport chain, a transport belt, a transport cable, a beaded cable or a toothed belt, in each case comprising a corresponding drive mechanism or a motor for moving the transport device. Furthermore, the transport device can be foldable in the manner of a carpenter's rule or folding rule. As a result of movement of the transport device, the seats or seat rows can then be brought to predetermined (in other words definable) seat pitches.

The above provides a mechanical solution with the simplest of means. For example, the seats comprise hooks, pins or projections. The drive device comprises corresponding encoding, for example transfer fingers in the form of eyelets or hooks, which fingers can engage the corresponding counter-pieces on the seats when the drive device is pulled past them. The drive device can be a mixture comprising cable sections and chain links, depending on the particular case. By correspondingly setting the space between the transfer fingers, the subsequent seat pitches are determined.

According to a further exemplary embodiment of the invention, the system is designed for shifting the seats or seat rows by means of the application of a thrust force to the individual seats or seat rows. In this case the transport device is a largely rigid transport device which is pushed forward by the motor or the corresponding drive mechanism, and then takes the seats along with it and shifts them.

The transport device is for example, designed in the manner of a carpenter's rule or folding rule, i.e. it is foldable. The lengths of the individual limbs, which are axially held relative to each other, of the transport device can be changed according to the seat pitches to be set. In order to change the length, for example, individual partial segments are inserted in the corresponding limb or are removed therefrom (including in the middle of a seat bench comprising three seats).

According to a further exemplary embodiment of the invention, the system is designed for self-contained individual shifting of the selected seats or seat rows. Individually selected seats can thus be shifted singly, for example according to personal requests of individual passengers during booking.

According to a further exemplary embodiment of the invention, the system comprises an electronic control device for controlling the drive device.

This control device can, for example, be operated by the cabin crew. Furthermore, the control device can be supplied with control data from outside the aircraft.

According to a further exemplary embodiment of the invention, the system comprises one or several separate seat rails for guiding the seats, and a locking device for each seat base attachment or seat base or seat or for each seat row for affixing the corresponding seat or the seat row to the seat rail.

To this effect, the seat and/or the seat rail can, for example, comprise an easy-glide coating (for example a polytetrafluoroethylene (PTFE) coating) or other surfaces with low mechanical resistance. In order to affix and secure the seats or seat rows, a quick-lock mechanism is provided, which can be controlled or operated electronically or purely mechanically.

According to a further exemplary embodiment of the invention, the locking device comprises a bar and a latching element or key, wherein the bar is provided for actuating the latching element, and after actuation can be detached from the latching element. The latching element is used to affix the seat to the seat rail or to some other immovable structure in the cabin.

If the bar, for example after it has been slid into the latching element, is turned in one direction, the seat is affixed. If the bar is turned in the other direction, the latching element is opened and the seat is released so that it can be shifted.

According to a further exemplary embodiment of the invention, the system comprises an input unit for changing the seat configuration planning by a passenger, wherein the input unit can be arranged outside the aircraft and in this case is coupled to the control device so that it can communicate wirelessly.

For example, at the time of making a booking the passenger can specify the amount of legroom s/he wishes to have available. Prior to boarding, the seat settings are then implemented accordingly.

According to a further exemplary embodiment of the invention, a seat arrangement in an aircraft is stated, which seat arrangement comprises a multitude of aircraft seats as well as a system as described above, for the simultaneous longitudinal shifting of the seats or seat rows.

According to a further exemplary embodiment of the invention, the use of a system as described above in an aircraft is stated.

According to a further exemplary embodiment of the invention, an aircraft comprising a system as described above is stated.

According to a further exemplary embodiment of the invention, a method for simultaneous longitudinal shifting of several selected seats or seat rows in an aircraft is stated, in which method a seat configuration is planned, and thereafter the seats or seat rows are automatically shifted according to a change in the seat configuration planning.

Shifting can also take place manually. In each case the seats are shifted simultaneously.

According to a further exemplary embodiment of the invention, the planned seat configuration is transmitted from an input unit to a control unit. Thereafter, automatic release of the affixation points of the individual seats or seat rows is carried out prior to shifting. After shifting, the seats or seat rows are then automatically affixed again.

According to a further exemplary embodiment of the invention, this input unit is arranged outside the aircraft so that the passengers or the ground staff can carry out seat configuration planning from outside the aircraft, for example before the aircraft has moved to the gate. In this way it is possible to save time.

Below, preferred exemplary embodiments of the invention are described with reference to the figures.

SHORT DESCRIPTION OF THE FIGURES

DETAILED DESCRIPTION OF THE EXEMPLARY EMBODIMENTS

Figure 1:
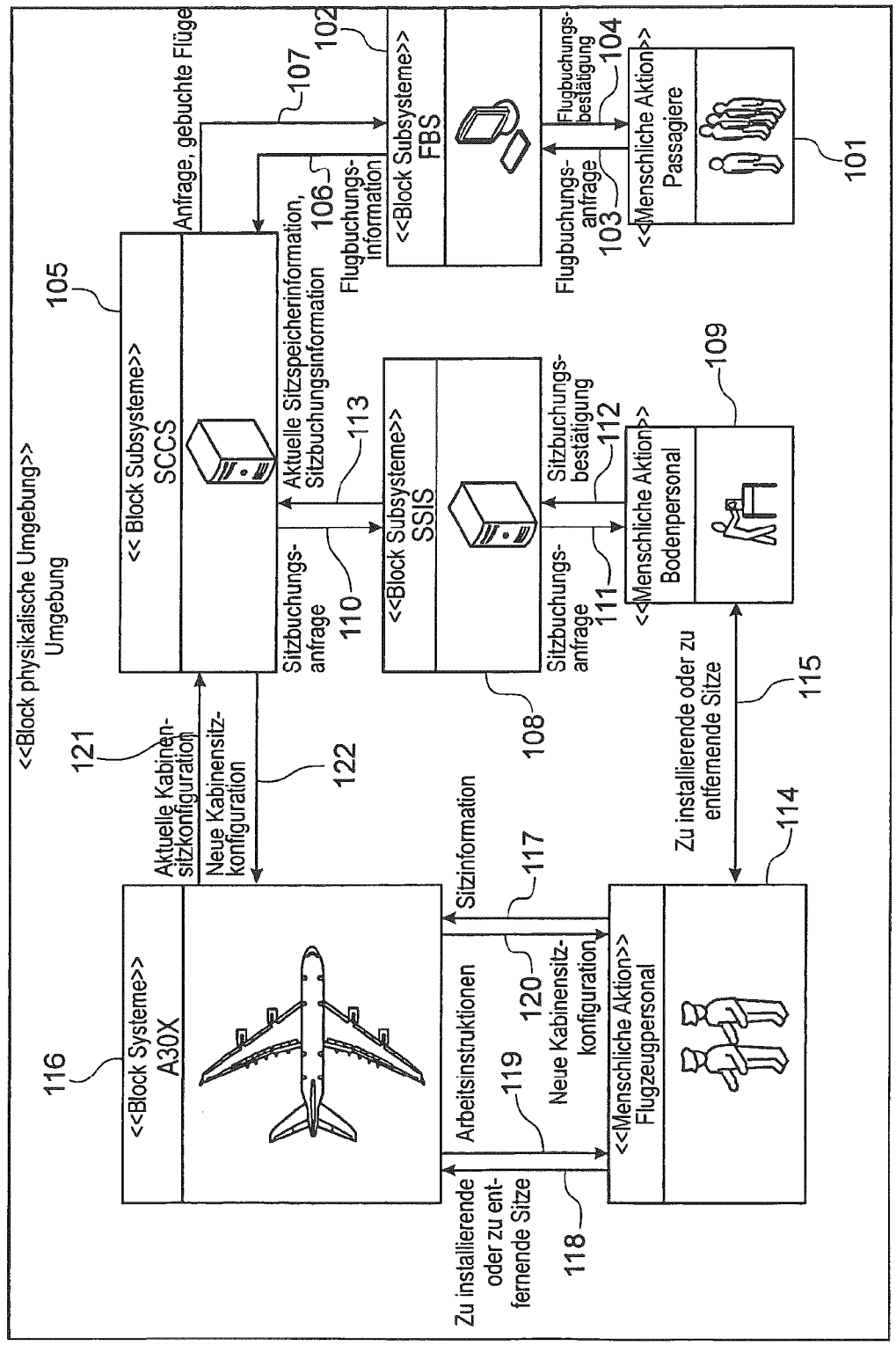
FIG. 1 shows a diagrammatic view of the information flow relating to a seat configuration according to an exemplary embodiment of the invention.

The illustrations in the figures are diagrammatic and not to scale.

In the following description of the figures the same reference characters are used for identical or similar elements.

FIG. 1 shows a diagrammatic view of an information flow relating to the seat configuration planning and a subsequent seat configuration. The passengers 101 make a request to the flight booking system FBS 102 relating to seat booking. This may be followed by a flight booking confirmation (see arrows 103, 104).

Subsequently, the flight booking information is forwarded by the seat booking system to a subsystem SCCS 105. Prior to this, the SCCS 105 has, for example, transmitted a corresponding request to the FBS 102 (see arrows 106, 107).

Furthermore, a so-called SSIS 108 is provided, which communicates with the SCCS 105 and the ground staff 109. For example, a request relating to a seat booking is transmitted by the SCCS 105 to the SSIS 108 (see arrow 110). This request is then forwarded by the SSIS 108 to the ground staff 109 (see arrow 111).

Correspondingly, seat booking confirmation is carried out by the ground staff 109 and forwarded to SSIS 108 (see arrow 112). This confirmation is then forwarded by the SSIS 108 to the SCCS 105, if applicable together with current seat storage information (arrow 113).

The cabin crew 114 is also in communication with the ground staff 109. By way of the communication path 115, data relating to the seats to be installed or removed is exchanged.

Furthermore, the cabin crew 114 is in communication with the aircraft 116. Thus, seat information 117 is transmitted to a corresponding aircraft system. Furthermore, an exchange of information relating to the seats 118 to be installed or removed takes place between the aircraft and the cabin crew. In addition, the aircraft transmits work instructions 119 to the cabin crew, and also new cabin seat configurations 120.

Data is also transmitted between the aircraft 116 and the SCCS 105. On the one hand the aircraft forwards the current cabin seat configuration 121 to the SCCS 105. On the other hand the new cabin seat configuration 122 is forwarded by the SCCS 105 to the aircraft 116.

All communications can be wireless communications.

Figure 2:
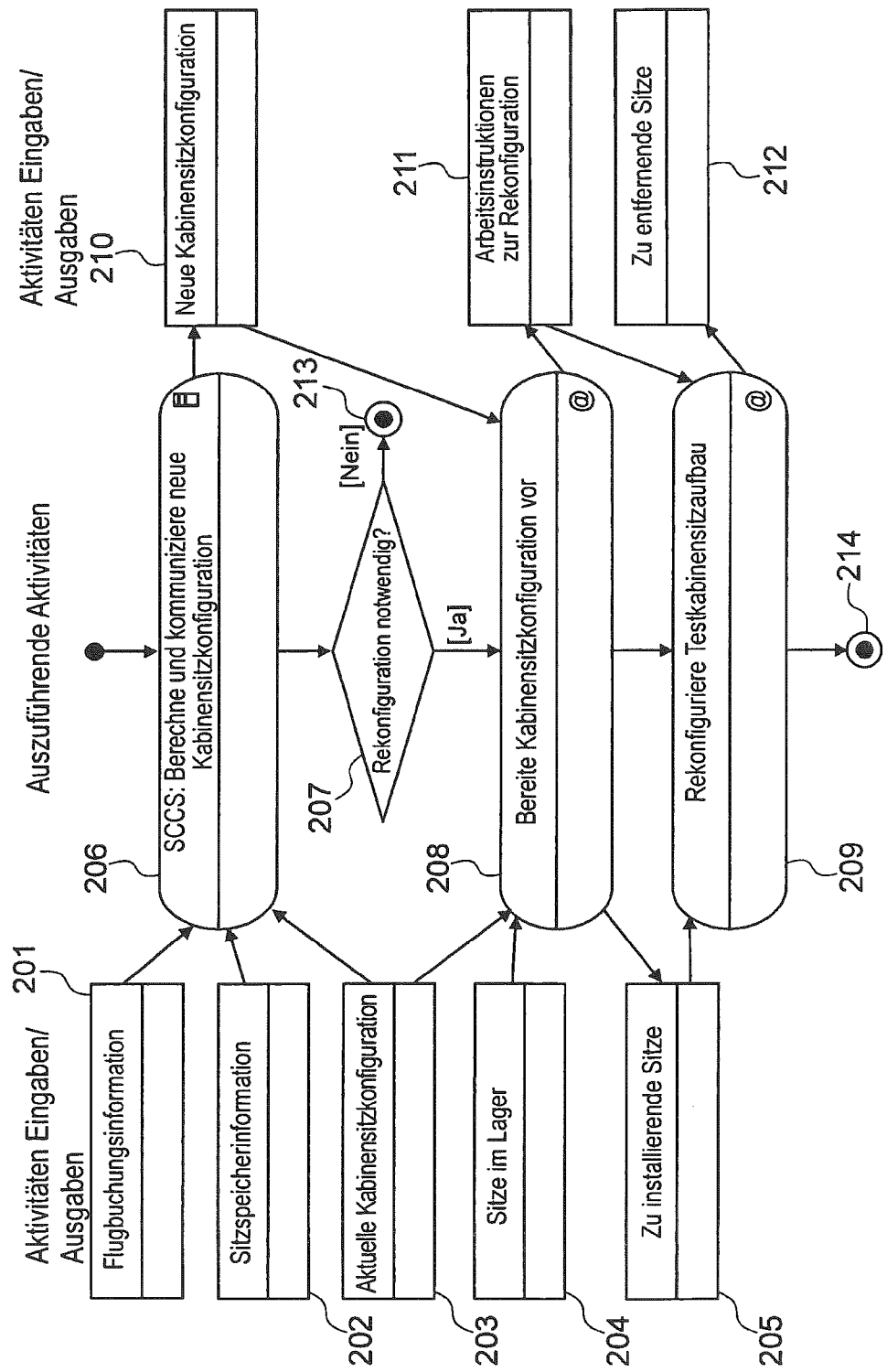
FIG. 2 shows a diagrammatic view of method-related steps according to an exemplary embodiment of the invention.

FIG. 2 shows a flow chart of a method according to an exemplary embodiment of the invention. In steps 201, 202, 203 flight booking information, seat storage information and information relating to the current cabin seat configuration are provided to the SCCS 206.

The SCCS 206 calculates and communicates a new cabin seat configuration 210 based on this information provided. Then follows a query as to whether reconfiguration is required. Should no reconfiguration be required, no further activities need to be carried out (see step 213). If reconfiguration is required, the cabin seat reconfiguration is prepared (step 208). To this effect the information relating to the new cabin seat configurations 210 is consulted. Furthermore, the information relating to the current cabin seat configuration 203 and the seats in storage 204 is consulted.

This is followed by a test of the reconfigured seat layout 209. For this purpose it is possible to also include work instructions for reconfiguration 211. A possible output 212 designates the seats that needs to be removed.

The method ends in step 214.

Figure 3:
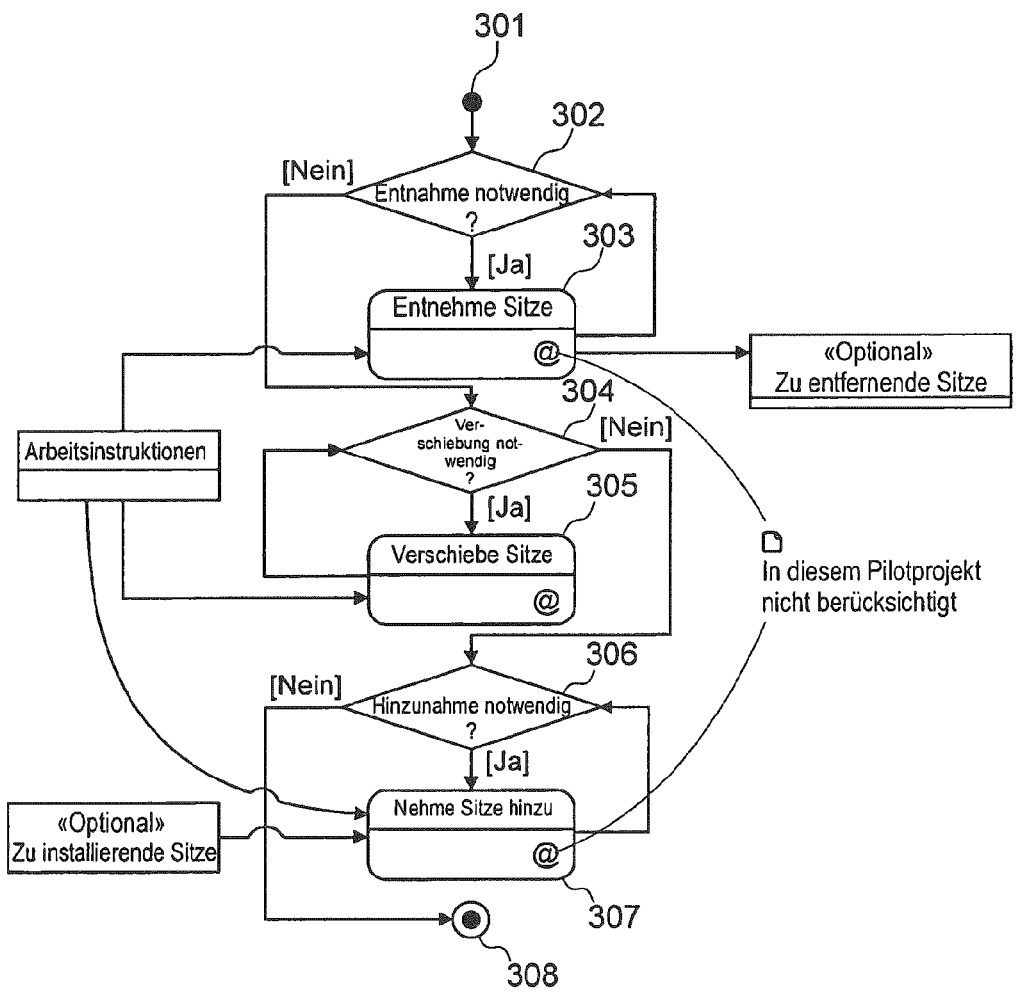
FIG. 3 shows a flow chart of a method according to an exemplary embodiment of the invention.

FIG. 3 shows a flow chart of a further method according to an exemplary embodiment of the invention. The diagram relates to the reconfiguration and testing of the seat layout.

The starting condition 301 is based on the aircraft having landed and all passengers having left the aircraft. In step 302 a decision is made as to whether it is necessary to take out seats. If taking out seats is necessary, the corresponding seats are removed (step 303). Thereafter the method restarts at step 302. As an alternative, the requisite space for seats in the cabin needs to be created (e.g. with the use of foldable galleys or unused self-service bars or folding seats).

If it is not necessary to take out seats, a decision is made as to whether seat shifting 304 is required. If shifting is required, the seats are shifted (step 305). If shifting is not required, a decision is made as to whether it is necessary to take in, or to install, seats (step 306). If seats need to be installed at this stage, new seats are installed (step 307). If it is not necessary to install new seats, the method ends in step 308.

Figure 4:
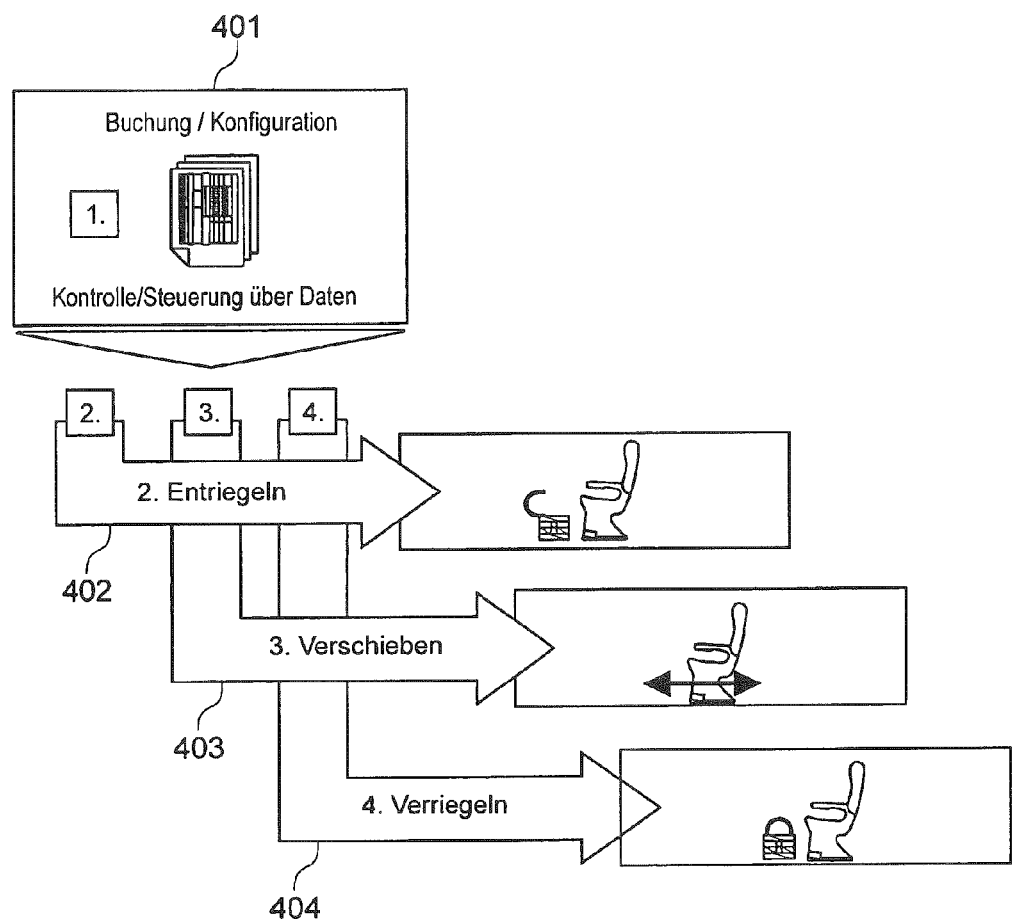
FIG. 4 shows a flow chart according to a further exemplary embodiment of the invention.

FIG. 4 shows a method-related process according to a further exemplary embodiment of the invention. In step 401 booking or configuration of the seats takes place. Corresponding control data is generated. This data is then transmitted to the aircraft, for example by way of a radio link. In step 402 unlocking takes place of the corresponding seats that need to be shifted or taken out. Unlocking can take place fully automatically or manually by the cabin crew. In step 403 the seats are shifted, and in step 404 locking or affixing the seats takes place.

Figure 5:
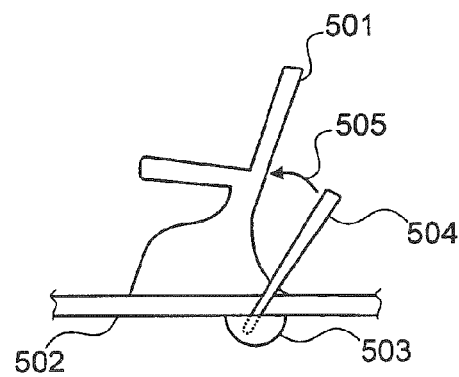
FIG. 5 shows a diagrammatic view of a seat with a latching element according to an exemplary embodiment of the invention.

FIG. 5 shows a diagrammatic view of a seat with a corresponding locking mechanism. The seat 501 is located on a seat rail 502 and is affixed to said rail 502 by means of a latching element 503. A bar 504 can be pushed into the latching element 503; when the bar is rotated (see arrow 505) anticlockwise, the seat is unlocked. It is also possible for the latching element 503 to be connected to a motor and to an electronic control device so that automatic electronic/electrical unlocking and locking of the seat can take place. For example, unlocking and locking the seat is possible from a central control console, i.e. by remote control.

Figure 6:
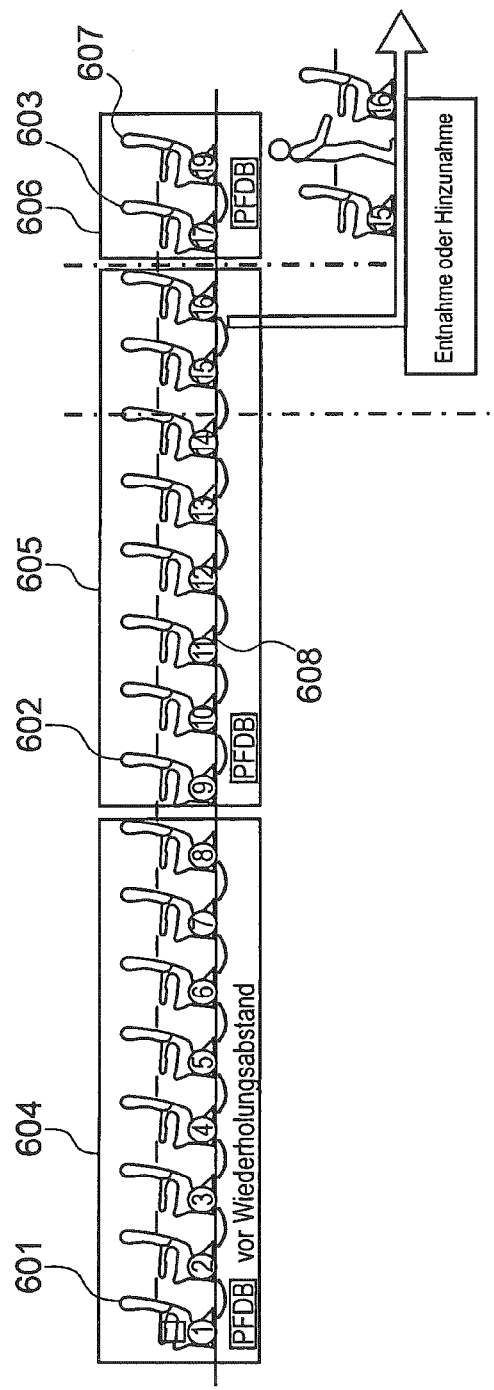
FIG. 6 shows a lateral view of a passenger cabin according to an exemplary embodiment of the invention.

FIG. 6 shows a lateral view of a passenger cabin with 19 seats and corresponding seat cabling, for example seats 601, 602, 603 that are arranged in three different classes 604, 605, 606.

If desired, the first seat row 601 is not shifted, for example due to a particular table arrangement. As a result of there not being any tables in seat row 607, if desired this last seat row 607 is not shifted either.

The seats are, for example, shifted in those locations where the cabin can provide space for seats (e.g. for reasons of transport). All the seats are located on a seat rail 608, to which they can be affixed and on which they can be shifted after releasing the affixation.

Figure 7A:
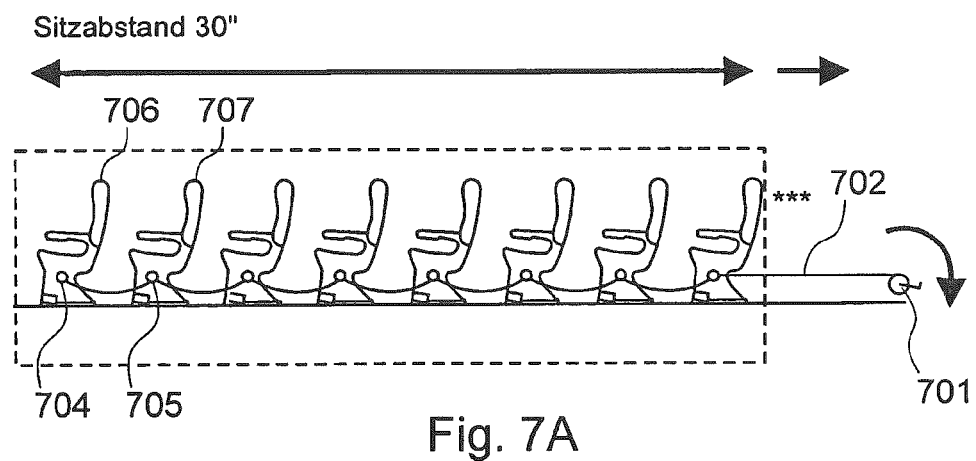
FIG. 7A shows a lateral view of a system according to an exemplary embodiment of the invention.

FIG. 7A shows a lateral view of a system for shifting seats according to an exemplary embodiment of the invention. The seats comprise an average seat pitch of 30 inches (approximately 76 cm). By means of rotating a drum 701, which rotating can occur manually or mechanically-driven by way of a motor, the transport device 702 is subjected to traction. The transfer fingers, see for example transfer fingers 704, 705, then cause the seats 706, 707 to be shifted when the corresponding cable section is subjected to traction.

Figure 7B:
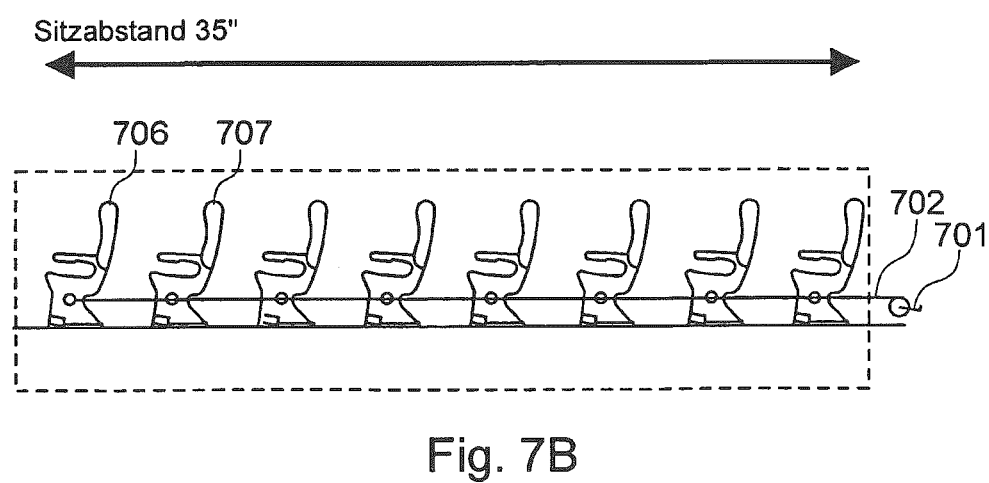
FIG. 7B shows a lateral view of the system of FIG. 7A in another state.

The seats can be displaced in a simple and easy manner. This is, for example, supported by a PTFE coating of the sliding regions. If, for example, the seat pitch is to be increased from 30 inches to 35 inches (approximately 90 cm), a further five inches (2.54 cm) is required for each seat. Overall, the transport device 702 thus needs to be "wound in" by 35 inches (see FIG. 7B).

Figure 8A:
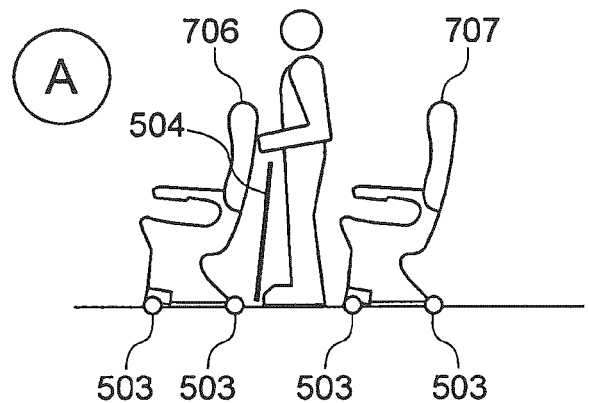
FIG. 8A shows a diagrammatic view of a releasing process of a first seat according to an exemplary embodiment of the invention.
Figure 8B:
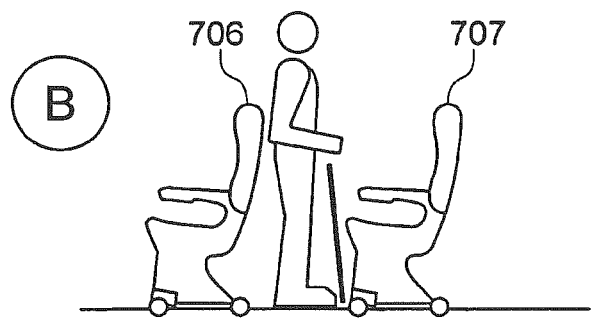
FIG. 8B shows a diagrammatic view of a releasing process of a second seat according to an exemplary embodiment of the invention.

FIGS. 8A and 8B show the process of releasing the front seat 706 and the rear seat 707.

Releasing the seats takes place, for example, purely mechanically by means of a latching device 503 and a corresponding bar 504. In this process the cabin staff moves from one seat to another, thus unlocking each seat separately.

Reconfiguring the seats takes at most 30 minutes. No special training of personnel is required. Personnel can work predominantly in an upright position. For safety reasons a special tool (for example a bar 504) is provided for locking or affixing the seats. Locking or unlocking several latches 503 of a seat takes place concurrently because the latches are coupled to each other. In this way it is possible to save time.

The locking process is identical to the unlocking process (except in reverse).

Shifting the individual seats or seat rows forwards or backwards takes place without the need to remove the seats from the seat rails.

Due to the low-friction bearing arrangement of the seats, ten or more seats or ten or more seat rows can be shifted by a single person. For each seat row it is possible to set an individual seat pitch of between 30 and 39 inches. All the seats can be shifted simultaneously, wherein, however, the seat pitch for each seat can be individually set. The means of transport (for example a cable or chain) comprises preset distances between the transfer fingers for all separate seats. These distances can, for example, be set outside the aircraft. The transport device is then brought on board by the cabin crew. On each seat or on particular seats of a seat row, for example, a hook is provided which can engage the corresponding transfer finger of the transport device when the transport device is pulled or pushed.

Figure 9:
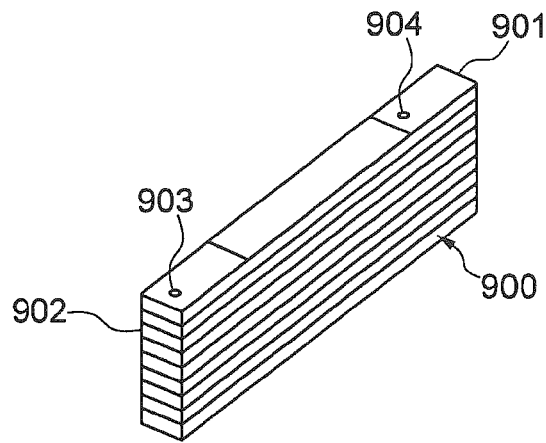
FIG. 9 shows a transport device according to an exemplary embodiment of the invention.

Of course, the seat pitch, i.e. the distances between seats, can not only be increased but also decreased, for example by the application of a thrust force. FIG. 9 shows a diagrammatic view of a transport device 900 that is designed as a foldable transport device, comparable to a carpenter's rule or a folding rule. The transport device 900 comprises several limbs 901, 902, etc. which in each case are connected to each other in pairs by way of an axial bearing arrangement 903 or 904, etc.

The setting of the transport device can, for example, be configured outside the aircraft; and the transport device is then brought into the aircraft and folded open in order to shift the seats.

Figures 10A, 10B:
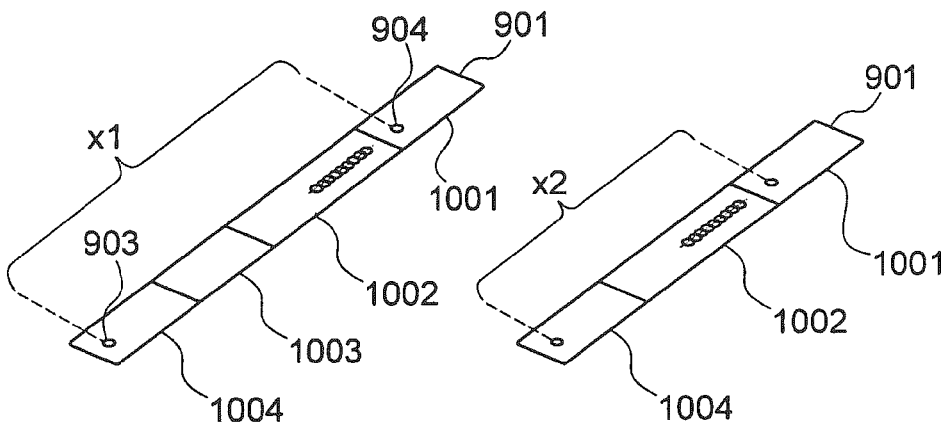
FIGS. 10A and 10B show two limbs of the transport device of FIG. 9.

FIGS. 10A and 10B each show a limb 901 of the transport device 900, in two different configurations.

In the first configuration of FIG. 10A the limb 901 comprises four elements 1001, 1002, 1003 and 1004 that are interconnected. In the embodiment of FIG. 10B the limb 901 comprises only three elements 1001, 1002 and 1004. Element 1003 has been removed in order to shorten the limb. In this way the corresponding seat pitch can be reduced (namely by the length of segment 1003).

Furthermore, additional segments can be added in order to increase the distances between seats depending on the seat configuration planning.

Figure 11:
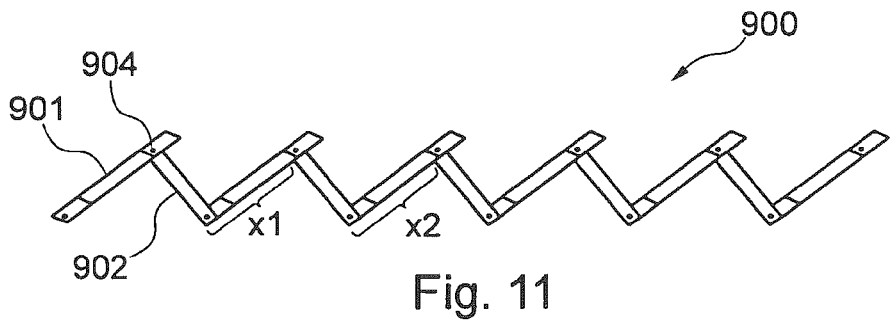
FIG. 11 shows the transport device of FIG. 9 in its partly folded-out state.

FIG. 11 shows a diagrammatic view of a transport device 900 in its partly folded-out state. This clearly shows how the individual limbs 901, 902, etc. are interconnected in pairs by way of the axes 904, etc. If the transport device 900 is fully folded out, for example the limbs engage each other so that folding back is rendered more difficult (similar to the situation in a folding rule).

Figure 12A:
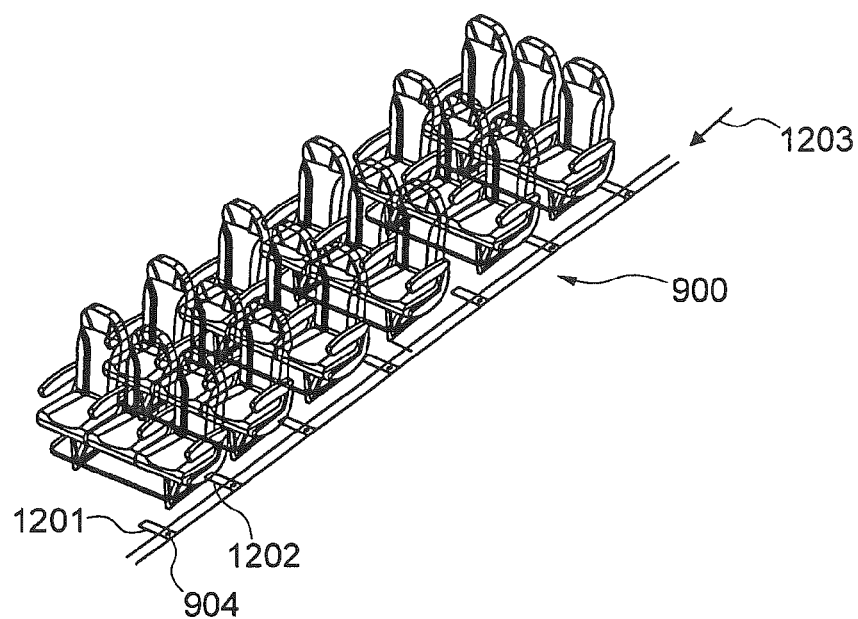
FIGS. 12A and 12B show the transport device of FIG. 9 in use in the aircraft cabin.
Figure 12B:
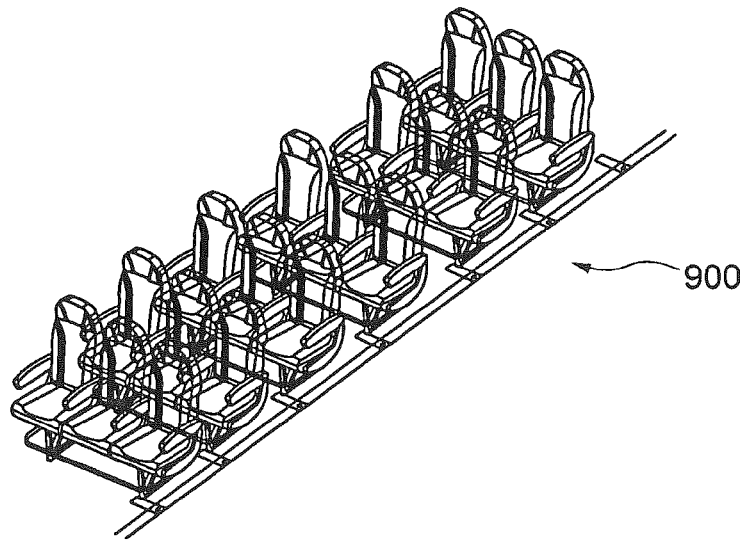

FIGS. 12A and 12B show the transport device 900 in use in the cabin. The transport device 900 is fully folded out and, for example on the axes 904, etc., comprises transfer fingers 1201, 1202, etc. which when the transport device pushes in the direction of the arrow 1203 (or opposite to this arrow) takes along the corresponding seat row (in other words pushes it forward or back).

FIG. 12A shows the seats before they have been shifted. FIG. 12B shows the seats after they have been shifted.

Figure 13:
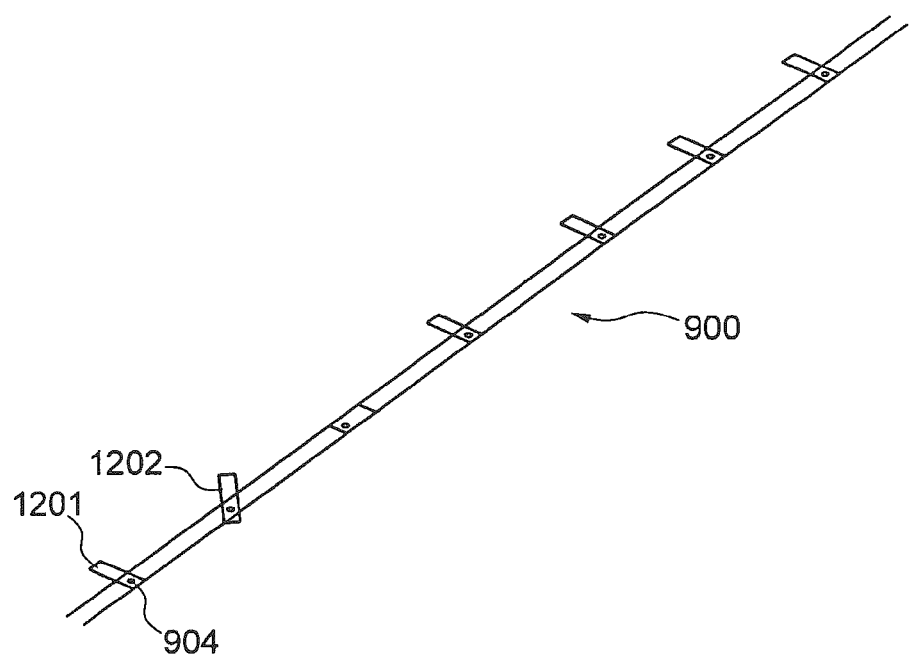
FIG. 13 shows a further diagrammatic view of a transport device according to an exemplary embodiment of the invention.

FIG. 13 shows a transport device 900 with individual "blockers" or transfer fingers 1201, 1202. An individual blocker stops the corresponding seat in the correct position. For example, the transport device can also simply be affixed to the cabin floor or to the seat rail; the seats are then manually shifted and stop at the corresponding blocker. The blockers can have a shared axis with the corresponding limb ("folding rule-limb") and can thus comprise the same bearing arrangement as the limbs of the transport device.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A system for simultaneous longitudinal shifting of several selected seats or seat rows in an aircraft, the system comprising:
    a drive device comprising a plurality of transfer fingers for shifting the seats;
    wherein the system is configured for shifting of the seats according to a change in seat configuration planning;
    wherein the drive device comprises an encoding of a planned seat configuration in the form of distances between the transfer fingers;
    wherein the seats or seat rows comprise corresponding counter pieces;
    wherein the transfer fingers are adapted for engaging the corresponding counter pieces of the seats or seat rows; and
    wherein the distances between the transfer fingers are changeable and subsequent seat pitches are determined by setting the distances between the transfer fingers.

2. The system of claim 1,
    wherein the system is configured as a mechanically coupled system.

3. The system of claim 1,
    wherein the system for shifting the seats or the seat rows is implemented by applying traction to the individual seats or seat rows;
    wherein the drive device is a transport device selected from the group consisting of a transport chain, a transport belt, a transport cable, a beaded cable and a toothed belt;
    wherein the drive device furthermore comprises a motor or a mechanism for moving the transport device; and
    wherein by moving the transport device the seats or seat rows can be brought to definable seat pitches.

4. The system of claim 1,
    wherein the system is configured for shifting the seats or seat rows by an application of a thrust force to the individual seats or seat rows.

5. The system of claim 1,
    wherein the system is configured for self-contained individual shifting of the selected seats or seat rows.

6. The system of claim 1, further comprising:
    an electronic control device for controlling the drive device.

7. The system of claim 1, further comprising:
    one or several separate seat rails for guiding the seats; and
    a locking device for each seat or for each seat row for affixing the seat to the seat rail.

8. The system of claim 7,
    wherein the locking device comprises a bar and a latching element;
    wherein the bar is provided for actuating the latching element, and after actuation can be detached from the latching element.

9. The system of claim 6, further comprising:
    an input unit for changing the seat configuration planning by a passenger;
    wherein the input unit is arranged outside the aircraft and is coupled to the control device for communicating wirelessly with the control device.

10. An aircraft comprising:
    a multitude of aircraft seats; and
    a system for simultaneous longitudinal shifting of the seats or seat rows, the system comprising:

a drive device comprising a plurality of transfer fingers for shifting the seats;

wherein the system is configured for shifting of the seats according to a change in seat configuration planning;

wherein the drive device comprises an encoding of a planned seat configuration in the form of distances between the transfer fingers;

wherein the seats or seat rows comprise corresponding counter pieces;

wherein the transfer fingers are adapted for engaging the corresponding counter pieces of the seats or seat rows; and wherein the distances between the transfer fingers are changeable and subsequent seat pitches are determined by setting the distances between the transfer fingers.

* * * * *